(12) United States Patent
Hiemstra

(10) Patent No.: US 9,079,515 B2
(45) Date of Patent: Jul. 14, 2015

(54) MODULAR RECLINE MECHANISM AND SIDEMEMBER FOR ROTARY RECLINER

(75) Inventor: Bruce A. Hiemstra, Ann Arbor, MI (US)

(73) Assignee: Johnson Controls Technology Company, Holland, MI (US)

( * ) Notice: Subject to any disclaimer, the term of this patent is extended or adjusted under 35 U.S.C. 154(b) by 327 days.

(21) Appl. No.: 13/389,472

(22) PCT Filed: Aug. 12, 2010

(86) PCT No.: PCT/US2010/045335
§ 371 (c)(1),
(2), (4) Date: Mar. 20, 2012

(87) PCT Pub. No.: WO2011/019922
PCT Pub. Date: Feb. 17, 2011

(65) Prior Publication Data
US 2013/0207432 A1 Aug. 15, 2013

Related U.S. Application Data

(60) Provisional application No. 61/233,330, filed on Aug. 12, 2009.

(51) Int. Cl.
B60N 2/225 (2006.01)
B60N 2/235 (2006.01)
B60N 2/68 (2006.01)

(52) U.S. Cl.
CPC ............ *B60N 2/2252* (2013.01); *B60N 2/2352* (2013.01); *B60N 2/2354* (2013.01); *B60N 2/682* (2013.01)

(58) Field of Classification Search
CPC .... B60N 2/2252; B60N 2/2254; B60N 2/682; B60N 2/2352
USPC ............................................ 297/362, 362.11
See application file for complete search history.

(56) References Cited

U.S. PATENT DOCUMENTS

| 4,439,053 A * | 3/1984 | Pelz .............................. 403/101 |
| 4,564,236 A * | 1/1986 | Kluting et al. ............. 297/344.1 |
| 4,736,986 A * | 4/1988 | Kato et al. ................. 297/367 R |
| 6,076,890 A | 6/2000 | Yoshida et al. |
| 7,255,399 B2 | 8/2007 | White et al. |
| 2005/0140190 A1* | 6/2005 | Kawashima ............. 297/216.14 |
| 2010/0181816 A1* | 7/2010 | Kienke et al. ................. 297/362 |
| 2010/0244530 A1* | 9/2010 | Kitano et al. ................. 297/362 |

FOREIGN PATENT DOCUMENTS

WO 2008049489 A1 5/2008

* cited by examiner

*Primary Examiner* — Milton Nelson, Jr.
(74) *Attorney, Agent, or Firm* — Dickinson Wright PLLC

(57) ABSTRACT

The adjustment device, also known as a recline mechanism, includes a sidemember that attaches to a vehicle seat having a uniform mounting surface allowing the attachment of a five-door as well as a three-door recline mechanism with a modular mounting plate without the need to have additional recline mechanisms.

7 Claims, 12 Drawing Sheets

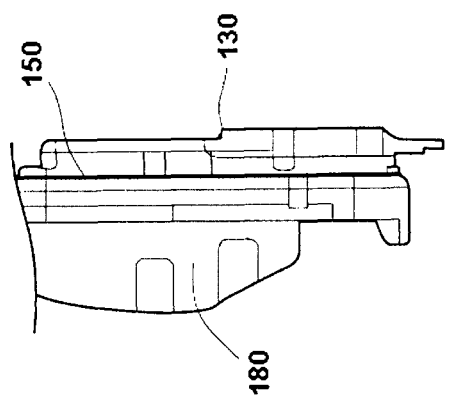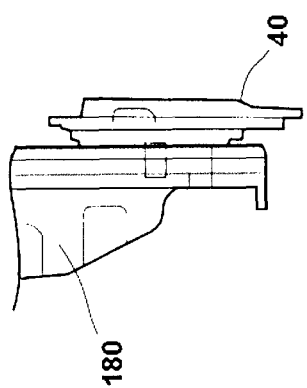
FIG.4

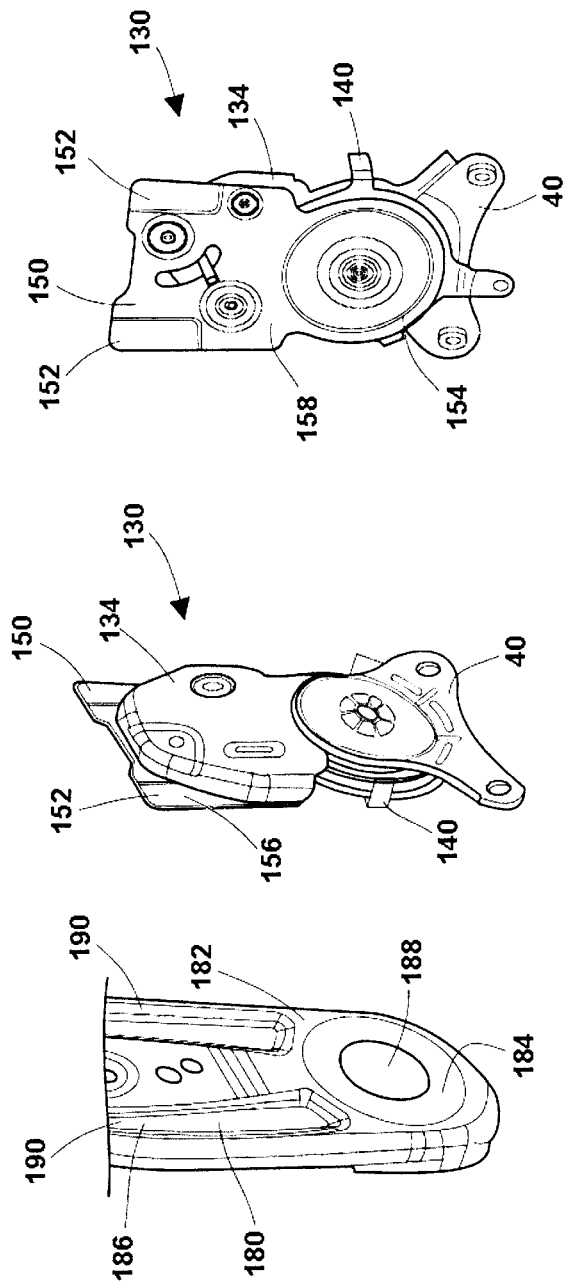

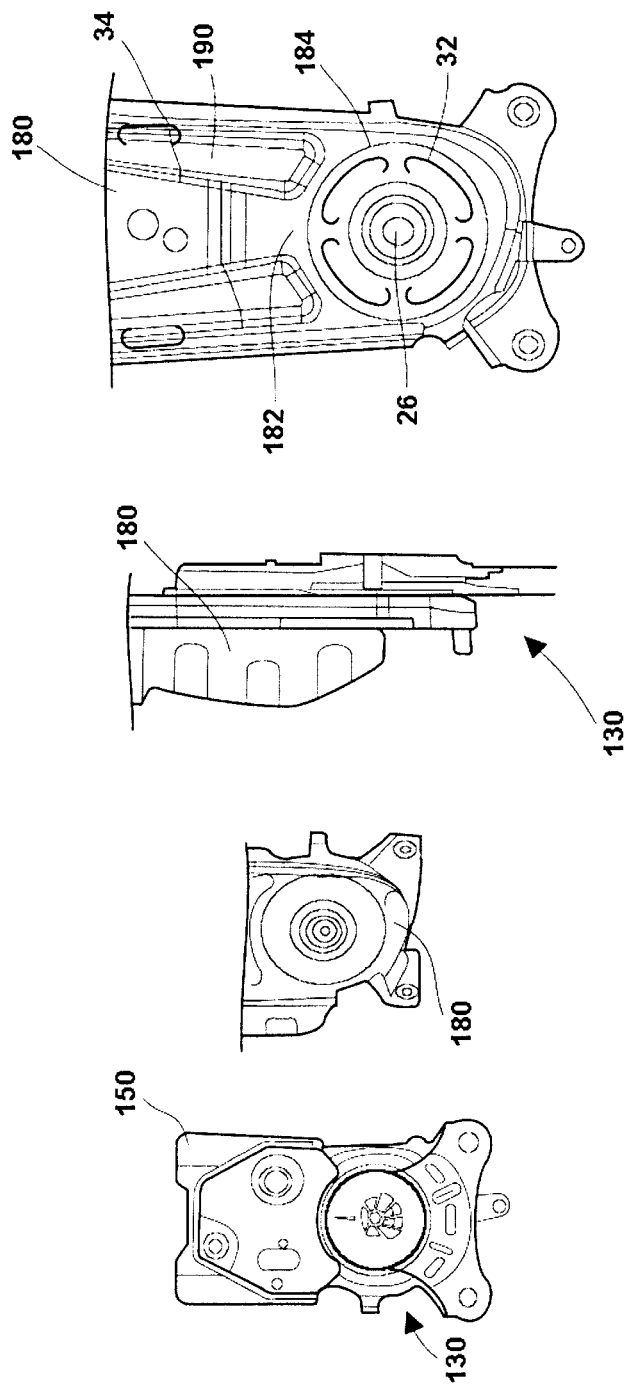

MODULAR RECLINE MECHANISM AND SIDEMEMBER FOR ROTARY RECLINER

CROSS REFERENCE TO RELATED APPLICATIONS

This U.S. National Stage Patent Application claims the benefit of International Application No. PCT/US10/045335 filed Aug. 12, 2010, entitled "Modular Recline Mechanism And Sidemember For Rotary Recliner" and U.S. Provisional Patent Application Ser. No. 61/233,330 filed Aug. 12, 2009, entitled "Modular Recline Mechanism And Sidemember For Rotary Recliner," the entire disclosures of the applications being considered part of the disclosure of this application and hereby incorporated by reference.

BACKGROUND

The present invention relates to an adjustment device for a vehicle seat and more particularly, to a tilt adjustment device which allows the seat back of a vehicle seat to move relative to the base of the vehicle seat. This tilt device is also referred to as a recline mechanism and generally includes an inner gear and outer gear which moveable to relative one another in order to provide tilt adjustment of the seat back relative to the seat base. Typically, the inner gear is fitted within the outer gear and is at least one tooth smaller such than when a rotating adjustment element drives an eccentric ring or carrier about an axis causing wedge segments to be dragged and eccentrically wedged around the rotational axis, the outer gear moves radially about an axis. Typically, for each rotation of the carrier and wedge segments, the outer gear is driven approximately ten degrees about the axis. After the seat back is in the preferred adjusted position, the inner and outer gears are locked from relative movement due to the wedge segments ensuring that the inner and outer gears stay meshed.

The above described rotation mechanism is commonly referred to as a five-door rotary recline mechanism. The five-door recline mechanism works well for vehicles where in the rear seat has a separate door. For example, the five-door recline mechanism is common on the front seats of sedans, SUV's and minivans. However, for some seat locations such as the front seats of coupes, middles seats of station wagons, SUV's and minivans, as well as the rear seats of five-door or hatchback vehicles, it is desirable to at times allow the seat back to pivot freely forward. For example, it may be desirable to fold the seat back down to allow ingress and egress quickly without using the five-door rotary recline mechanism. Typically, recline mechanisms that include these additional features that allow free motion of the seat back relative to the seat base in certain conditions are referred to as three-door rotary recline mechanisms. The three-door recline mechanism generally includes a five-door mechanism described above, modified with minor changes, and an additional latch assembly that engages gear teeth on the outer edge of the outer gear. Generally, the latch assembly allows the seat back to be released from engaging the outer gear of the five-door recline mechanism such that it may rotate independent of the five-door recline mechanism that is included in the three-door recline mechanism. In some embodiments, the free rotation of the vehicle seat back also allows through additional elements for the track to be released and the seat to slide forward in one motion typically to allow easy ingress and egress from the vehicle seat.

Traditionally, the five-door recline mechanism was attached to a sidemember on the seat back which provided structural rigidity and was configured to be coupled to the frame of the seat back. The five-door recline mechanism was typically welded to this sidemember as generally illustrated in FIG. 3. However, if a recline mechanism requires the inclusion of an upper mount five-door mechanism otherwise known as a three-door recline mechanism, the sidemember 200 used on the seat back with a five-door recline mechanism was not useable with a three-door recline mechanism and required the use of a different sidemember 201, also illustrated in FIG. 3, that had an offset 202. Therefore, the prior sidemember 200 included a flat interface portion 204 if only a five-door recline mechanism was to be installed but if an upper mount five-door mechanism or a three-door recline mechanism was also to be installed, a different prior sidemember 201 that included the offset 202 and a raised mounting portion 206 to which the latch assembly of the three-door recline mechanism was mounted. Therefore, in the past each sidemember 200, 201 had a unique and specific surface profile for permitting the attachment of the relevant recline mechanism. This was required to obtain the desired mounting as well as a small package size as there was no way to mount a three-door recline mechanism to a sidemember 200 that was designed for use with a five-door recline mechanism.

As many of the seatbacks are formed in separate factories and are shipped for assembly elsewhere, increased inventory space is required as well as additional assembly time to create and assembly two different seat backs each including the different sidemembers 200 or 201 to the seat base. This additional inventory requirement and additional processing is not desirable.

SUMMARY OF THE INVENTION

The present invention generally relates to an adjustment device for a seat and more particularly, to a tilt adjustment device for a seat back. The adjustment device, also known as a recline mechanism, includes a sidemember that attaches to a vehicle seat having a uniform mounting surface allowing the attachment of a five-door as well as a three-door recline mechanism with a modular mounting plate without the need to have additional recline mechanisms.

BRIEF DESCRIPTION OF THE DRAWINGS

FIG. 4 is a side schematic view of a sidemember coupled to a five-door recline mechanism as well as the same sidemember coupled to a three-door recline mechanism;

FIG. 6 illustrates a sidemember and individually a five-door and three-door recline mechanism being mounted to the sidemember;

FIG. 6A illustrates a front perspective view of the modular mounting plate and the five-door and three-door mechanisms being mounted thereto.

FIG. 8A illustrates a front view of a three-door rotary recline mechanism including a modular mounting plate;

FIG. 8B illustrates a side view and a rear view of the three-door rotary recline mechanism attached to a sidemember including the weld locations;

DESCRIPTION

Figure 1:
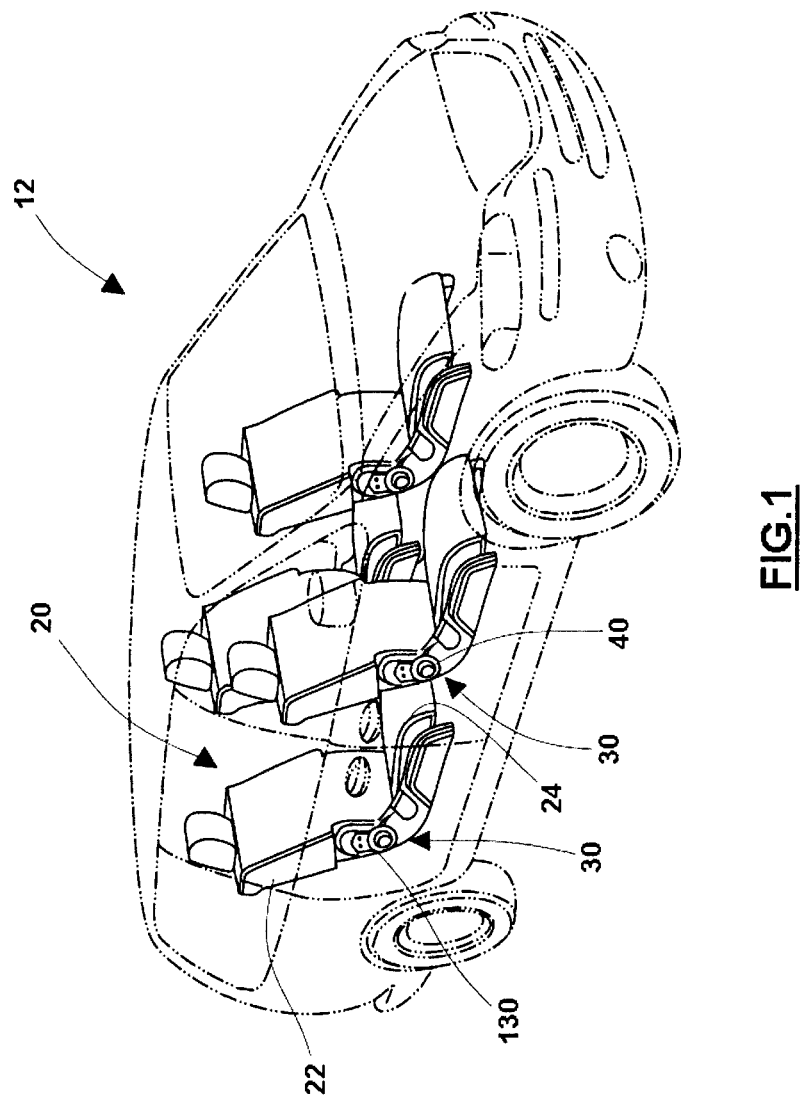
FIG. 1 is a perspective view of a vehicle in phantom illustrating the seat locations in the vehicle and the recline mechanisms on the vehicle seats.
Figure 2:
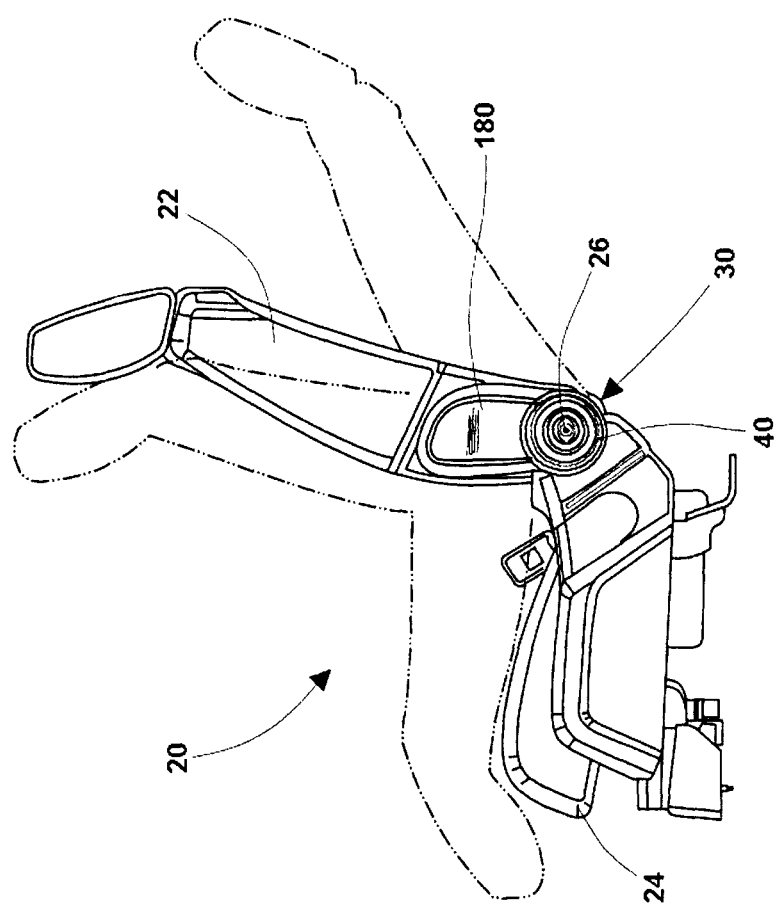
FIG. 2 illustrates a side view of a vehicle seat including a recline mechanism with various positions of the seat back as shown in phantom.

The present invention as illustrated in FIGS. 1 and 2 is directed to a rotary recline mechanism 30 which is assembled to a seat assembly 20 in a vehicle 12. The seat assembly 20 generally includes a seat back 22 and a seat base 24. The seat assembly 20 is configured such that the powered rotary recline mechanism 30 drives the seat back about a rotational axis 26 relative to the seat base 24. More specifically, the rotary recline mechanism 30 is primarily configured to provide titling of the seat back 22 such that a vehicle occupant may maximize the comfort of their seating position. The mechanism 30 is powered such that upon a push of a button, the mechanism 30 drives the seat back 22 about the rotational axis 26 relative to the seat base 24.

The rotary recliner mechanism 30 is generally assembled from a sidemember 180 which is coupled to the seat back 22 and more specifically typically coupled to the frame of the seat back (not shown), and one of a five-door recline rotary mechanism 40 or a three-door rotary recline mechanism 130. The three-door rotary recline mechanism 130 generally includes the five-door rotary recline mechanism 40, with minor changes, adds a latch assembly 134 that allows the seat back to be selectively pivoted freely without engaging the power tilt mechanism of the rotary recline mechanism 30 and a modular mounting plate 150. More specifically, the five-door rotary recline mechanism 40 is typically configured for vehicle seats in which it is not necessary to tilt and slide the seat 20 forward to allow ingress or egress or stowing of the seat 20 to provide additional cargo space. Therefore, in most sedans, minivans, SUV's, crossovers and other vehicles having more than two passenger doors, the front seats of the vehicles will typically include the five-door rotary recline mechanism 40. The remaining seats may include either of the five-door rotary recline mechanism 40 or three-door rotary recline mechanism 130. The selected recline mechanism 30 is generally determined whether or not it is desirable to tilt the seat forward quickly without engaging the slower powered tilt function of the seat. For example, the three-door rotary recline mechanism 130 would be specifically applicable to a coupe having only two passenger doors on the front passenger seats which would allow upon the push of a latch button, disengagement of the latch assembly 134 from the outer gear 90 and thereby pivoting of the seat back 22 freely and quickly about the axis 26. This mechanism 130 may also be installed in the rearward seats or middle row seats of the SUV's, crossovers, minivans and other vehicles including hatchbacks and sedans where it is desirable to either fold flat the seating or tilt the seat back 22 fully forward for cargo space or easier ingress or egress. As described below in addition, the three-door rotary recline mechanism may also be interconnected with the tracks (not illustrated) which control the forward and rearward movement of the seat base 22. More specifically, when the seat back 22 is pivoted forward, release the track engagement such that the seat base 24 may slide easily forward out of the way to improve ingress and egress to the vehicle 12.

Figure 3:
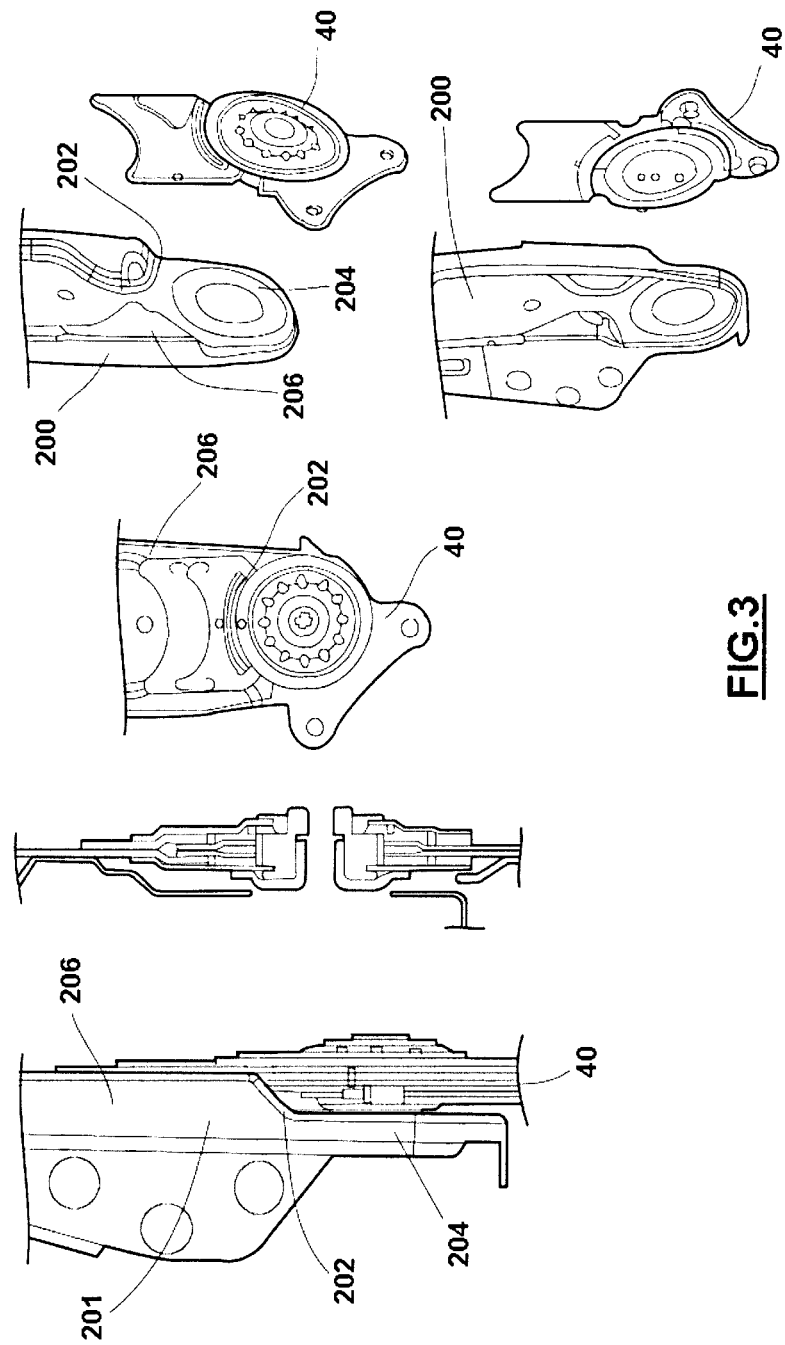
FIG. 3 illustrates a prior sidemember for attachment to a seat back having an offset for attachment with an upper mount five-door mechanism or a three-door recline mechanism as well as a second prior sidemember with an offset for attachment to a direct or center mount five-door recline mechanism.
Figure 5:
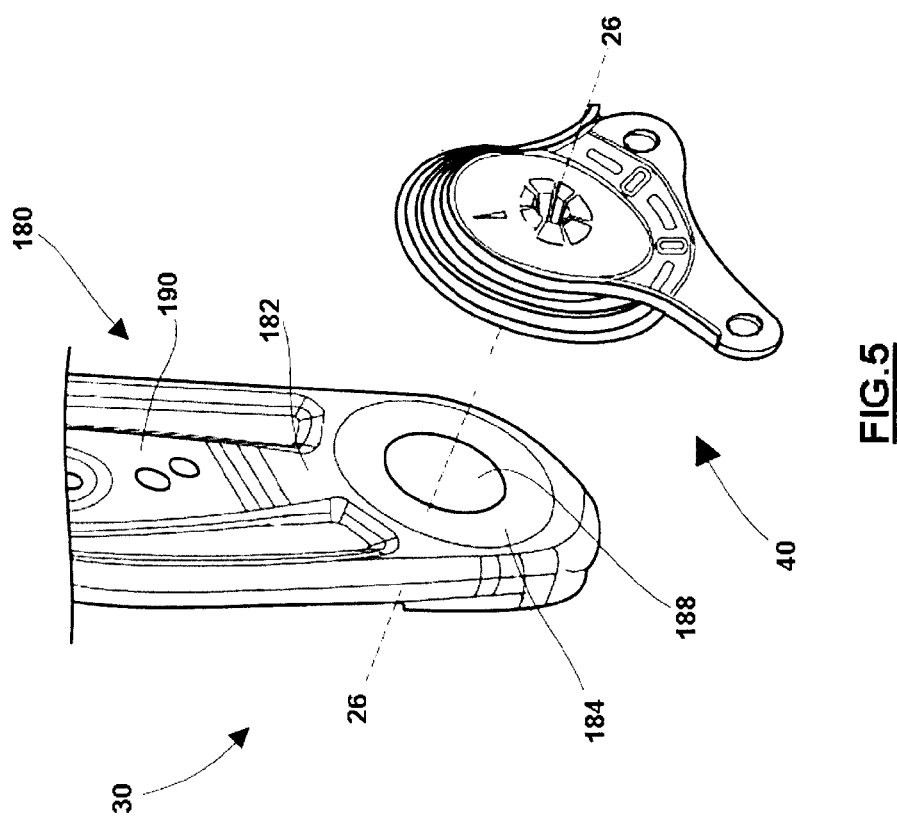
FIG. 5 illustrates the mounting of a five-door mechanism to the sidemember.
Figure 5A:
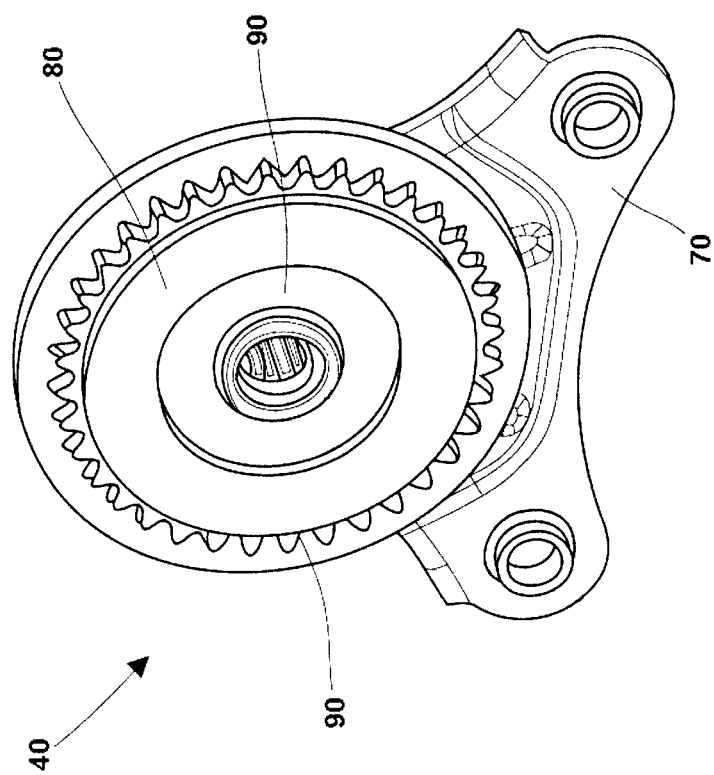
FIG. 5A illustrates a rear perspective view of the five-door mechanism that is mounted to the sidemember.
Figure 7C:
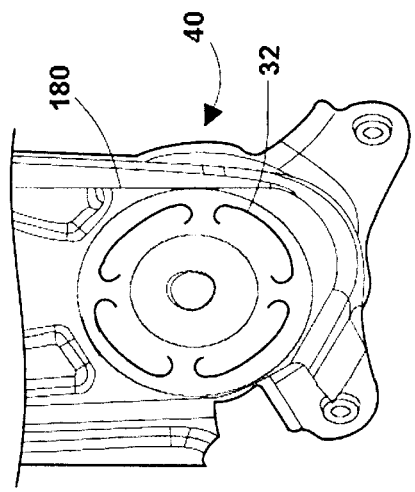
FIG. 7C illustrates a rear perspective view of a five-door rotary recline mechanism coupled to the sidemember as well as the welding locations.
Figure 7A:
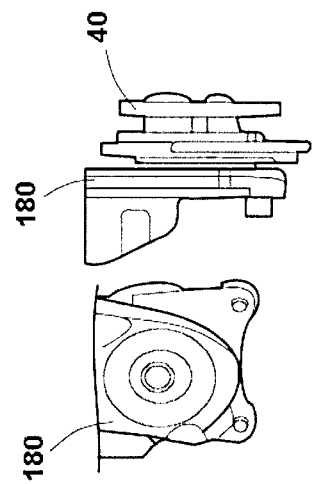
FIG. 7A illustrates a rear view and side view of a manual discontinuous five-door recline mechanism coupled to a sidemember.
Figure 7B:
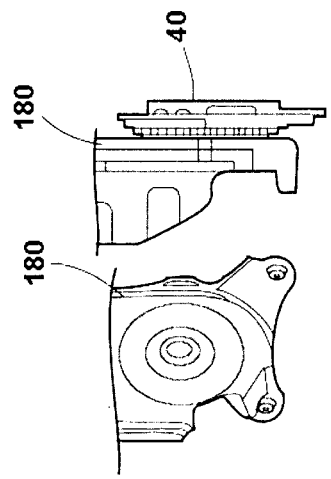
FIG. 7B illustrates a rear perspective view and a side view of a five-door rotary recline mechanism coupled to the sidemember.

The sidemember 180 is configured to allow uniform attachment of both the five-door recline mechanism 40 as well as a three-door rotary recline mechanism 130. Previously, each type of recline mechanism 40, 130 needed a different sidemember 200, 201 which increased inventory cost and assembly time. The sidemember 180 is configured to provide a lower support surface 184 having an axial hole 188 and a weld area 186 to which the five-door rotary recline mechanism 40 may be welded. The sidemember 180 is designed to permit attachment of each of the rotary recline mechanisms 40, 130 and does not have the offset 202 described above to create the raised mounting portion. Instead, the sidemember 180 which is the same design for the three-door and five-door rotary recline mechanisms 40, 130 is modular and used in each application. Instead, the sidemember 180 includes a uniform attachment surface 182 extending circumferentially about the rotary axis 26 of the recliner mechanism 30 and away from the rotary axis to provide the above described lower support surface 184 as well as an upper support surface 190. The attachment surface 182 extends along a substantially planar surface or configured surface that is coincident with the rear mounting surface 156 of the modular mounting plate 150 as described below. Therefore, the sidemember 180 has a surface contour to match the surface 156 of the modular mounting plate 150. In other words, the attachment surface 182 is not recessed or formed from an offset as shown in the prior art sidemembers in FIG. 3. Both of the lower support surface 184 and upper support surface 190 include weld areas 186 that allow the welding of the five-door recline mechanism 40 as well as the modular mounting plate 150 of the three-door recline mechanism 130. As described below, for the five-door recline mechanism 30, the outer gear 90 may include a surface 102 which is welded to the sidemember 180. For the three-door recline mechanism, the latch assembly 132 is coupled to the modular mounting plate 150 such as by a weld and the modular mounting plate is in turn welded to the side member 180. As further illustrated in the Figures, the modular-like sidemember 180 is formed to provide uniform attachment surfaces 182 also across the upper support surface 190 for attachment of other components of the recline such as the latch assembly 132. However, the upper surface 190 can also extend along the plane coincident with the surface 156 of the modular mounting bracket 150. The key feature of the sidemember 180 is that it is configured to allow the individual attachment of a five-door rotary recline mechanism 40 solely or the attachment of a three-door rotary recline mechanism 130 which is formed from the combination of a five-door rotary recline mechanism 40 (with minor changes such as to the outer gear 90) in combination with the latch assembly 134 and modular mounting plate. The attachment of the five-door recline mechanism 40 to the sidemember 180 is clearly illustrated in FIGS. 5 and 5A. The attachment of the three-door rotary recline mechanism 130 including a modular mounting plate 150 to which the latch assembly 134 and five-door rotary recline mechanism 40 are attached is then further attached to the sidemember 180 via welding is illustrated in FIGS. 6 and 6A. FIGS. 7A, 7B and 7C further illustrate the attachment of and weld locations 32 of the five-door recline mechanism 40 to the sidemember 180 from different viewpoints. FIGS. 8A and 8B also illustrate the attachment of three-door rotary recline mechanism 130 formed from the latch assembly 134, modular mounting plate 150 and uniquely configured five-door rotary recline mechanism 40 to the sidemember 180 along with the lower welds 132 and upper welds 134 which are configured to be welded at the upper weld surfaces 152 on the modular mounting plate 150.

Figure 9:
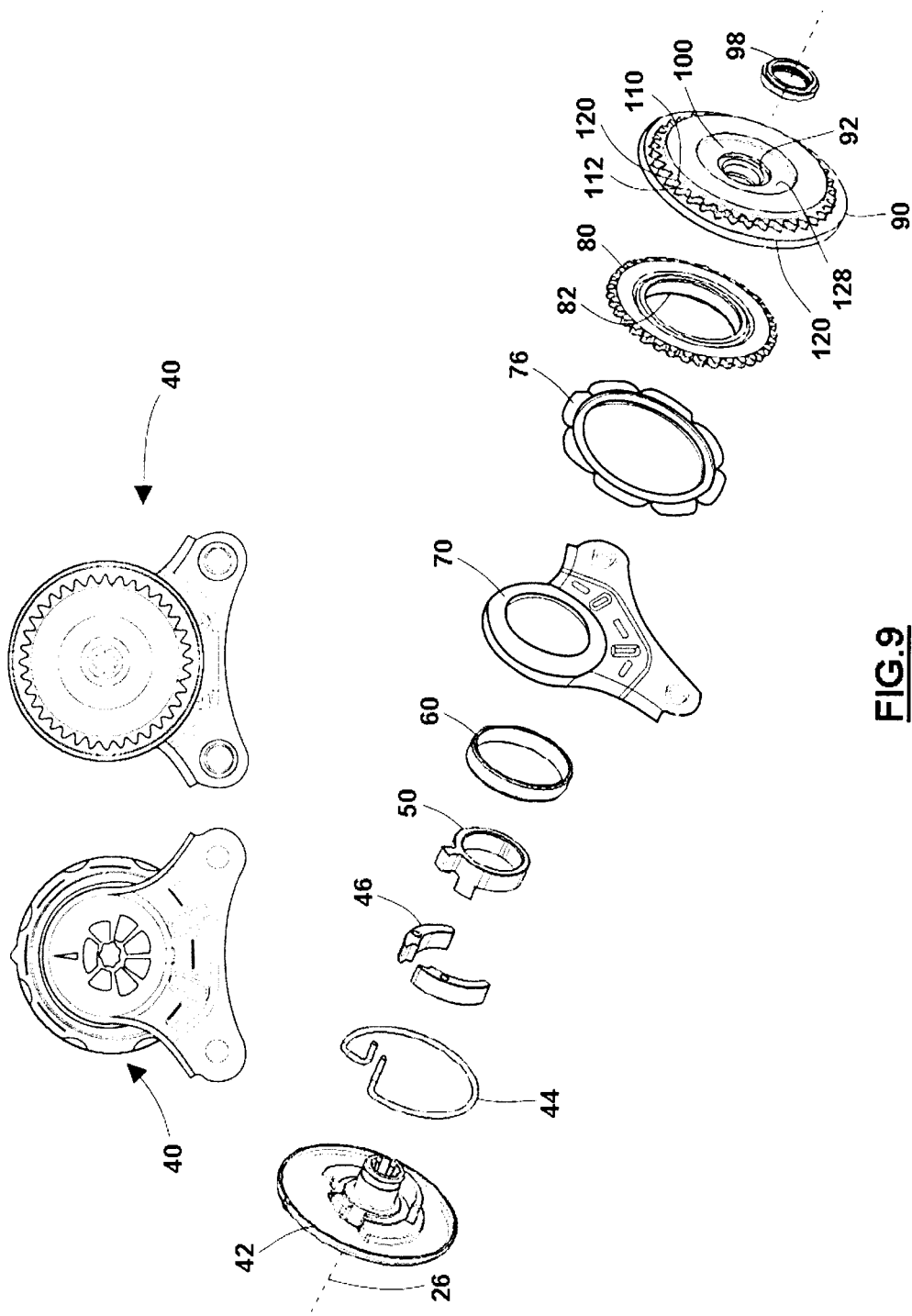
FIG. 9 is an exploded perspective view of a five-door rotary recline mechanism as well as a front and rear view of the assembled five-door rotary recline mechanism.

The five-door rotary recline mechanism 40 is particularly illustrated in FIG. 9 in an exploded perspective view as well as a front and rear view. While the five-door rotary recline mechanism 40 may be made in a variety of configurations such that it provides power recline, the present invention uses an outer gear 90 into which an inner gear 80 is placed. The inner gear 80 fits within the outer gear 90 and has one less gear tooth than the outer gear 90 such that as the inner gear 80 is driven around inside the outer gear 90, the outer gear is typically rotated approximately 10 degrees radially, more specifically the angle of the seat back changes by ten degrees. Of course, different gear configurations may be used but this is the most common system. Generally, the five-door rotary recline mechanism 40 includes an outer cap 42, spring 44, wedges 46, wedge carrier 50, bearing 60, assembly bracket 70, gear retainer bracket 76, inner gear 80, outer gear 90, and retainer 98 as illustrated in FIG. 9. These items in FIG. 9 are assembled into the five-door rotary recline mechanism 40 illustrated above the exploded perspective view in FIG. 9. Typically, a power mechanism (not illustrated) rotates the outer cap 42 which in turn drives the wedge carrier 50 around inside of the bearing 60 which moves the wedges 46 radially about the rotational axis 26. The wedges 46 force the bearing 60 against the inner gear specifically the circumferential inner surface 82 defined by the inner gear 80. Inside with the wedges contact the bearings 60, the bearing 60 then bears against the inner gear to ensure that the teeth 84 on the inner gear 80 engage the teeth 96 on the outer gear 90. Since the outer gear 90 is welded to the sidemember 80 as the outer gear pivots about the rotational axis 26, the sidemember 180 is also forced to pivot about the rotational axis 26 thereby providing tilt to the seat back 22.

The outer gear 90 generally includes an inner portion 100, an intermediate portion 110 and an outer portion 120. An axial hole 92 also extends through the inner portion 100. The inner portion 100 is usually configured to have an optional raised portion 128 which raised to contact the sidemember 180 and thereby having a weld surface 102 that engages the weld area 186 or more specifically, the lower support surface 184. The intermediate portion is formed to extend between the inner portion 100 and outer portion 120 wherein the inner portion 100 is located in the different plane than the outer portion 120. More specifically, the intermediate portion is configured to have a gear cavity 116 with inner teeth 114 into which the inner gear 80 is placed. Of course, by most forming processes, the intermediate portion 110 may also include outer teeth 112, however these are not typically used. The outer portion 120 generally includes on the average five-door mechanism, an outer edge 120 that is smooth or round in shape.

Figure 10:
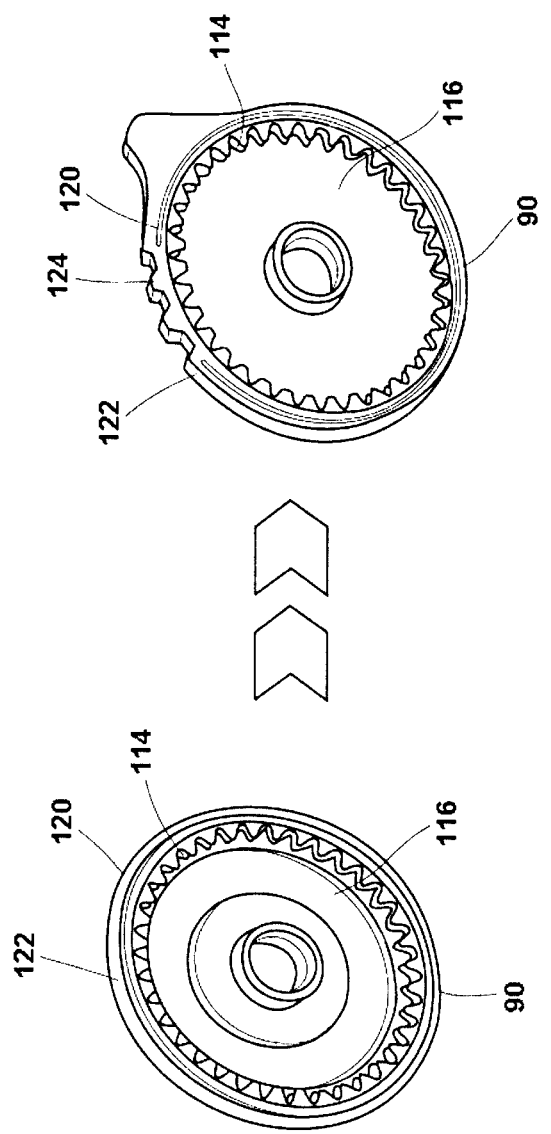
FIG. 10 illustrates the differences between a five-door rotary recline mechanism outer gear on the left and a three-door rotary recline mechanism outer gear on the right.

When the five-door rotary recline mechanism 40 is combined with the latch assembly 134 into a three-door rotary recline mechanism 130, the outer gear 90 receives optional teeth 124 on the outer edge 122 as illustrated in FIG. 10. FIG. 10 illustrates the differences between the outer gear 90 used in a five-door rotary recline mechanism 40 and an outer gear 90 that is used with the three-door rotary recline mechanism 130. More specifically, for a single five-door rotary recline mechanism 40, the outer gear 90 is changed such that it includes the optional raised portion 128 and generally does not include any gear teeth 124 on the outer edge 122. When used in a three-door rotary recline mechanism 130, the individual five-door rotary recline mechanism 40 has a different outer gear 90 which does not include the optional raised portion 128 and generally is formed thinner in that area and includes instead optional gear teeth 124 on the outer edge 122 that the latch assembly 134 may engage.

Three-door rotary recline mechanism 130 generally is formed from the modified five-door rotary recline mechanism 40 as discussed above and a latch assembly 134 that are placed upon a modular mounting plate 150 which is in turn welded to the sidemember 180. The differences between mounting a three-door rotary recline mechanism 130 to the sidemember 180 and mounting a five-door rotary recline mechanism 40 to the sidemember 180 is most importantly the use of the modular mounting plate 150. The modular mounting plate 150 is generally configured to have a contour similar to that of the sidemember 180 and thereby provide the weld areas 186 specifically at the lower support surface 184 and upper support surface 190. The weld areas 186 at the lower support surface 184 are typically the same of that used with the five-door rotary recline mechanism 40 however, the modular mounting plate 150 is also welded to the sidemember 180 using the upper support surface 190 with the weld areas 186 on the sidemember 180 being welded to the upper weld surface 152 on the modular mounting plate. The modular mounting plate 150 specifically allows for the attachment of either a five-door rotary recline mechanism 40 individually or a three-door rotary recline mechanism 130 via the modular mounting plate 150 to a single profile sidemember 180 wherein the sidemember 180 does not change dependent upon what is to be mounted thereby reducing the manufacturing costs and inventory costs. Mores specifically, as the sidemember 180 is configured to be attached to the seat back 22, inventorying various versions of the sidemember 180 significantly increases the inventory cost and space required as compared to the reduced parts needed of the present invention. More specifically, the variations needed are only a three-door rotary recline mechanism 130 which is attached itself to the modular mounting plate and thereby a single item, the five-door rotary recline mechanism 40 by itself and the sidemember 180. This reduces the number of parts held in inventory to a minimum of three and also allows for smaller configuration of the individual parts as carrying a three-door rotary recline mechanism 130 on a modular mounting plate 150 requires significantly less space than carrying two different seat backs 22 each having different sidemembers 180.

The modular mounting plate 150 is most clearly illustrated in FIGS. 6 and 6A. The modular mounting plate 150 is configured to have an axial hole 154 through which the outer gear 90 may be still welded to the sidemember 180. The modular mounting plate 150 is further welded to the sidemember 180 at the upper weld surface 152 and an upper attachment surface 190.

The three-door rotary recline mechanism 130 further include a latch assembly 134 which may be any known or desirable latch assembly that is capable of latching to the outer gear 90. As described above, the latch assembly 134 is generally configured to allow free rotation of the seat back 22 relative to the seat base 24 about the rotational axis 26 without engaging the power tilt or recline mechanism through the five-door rotary recline mechanism 40. An exploded view of the three-door rotary recline mechanism 130 is further illustrated in FIG. 11 as including the modular mounting plate 150, an optional dump ring 140, the specially configured five-door rotary recline mechanism 40 and the latch assembly 134. The dump ring 140 may not be required in some instances but is generally used to disengage the track assembly to allow free forward or rearward motion of the seat assembly when the seat back 22 has been reclined through the latch assembly 134. More specifically, the latch assembly 134 engages the optional gear teeth 124 on the outer portion 120 of the outer gear 90 and when released from these optional gear teeth 124, allows pivoting of the seat back 22 relative to the seat base 24 independent of the five-door rotary recline mechanism 40. This pivoting of the seat back 22 if the dump ring 140 is included, also pivots the dump ring 140 and the cable mount 142 is connected to a cable (not illustrated), which pulls upon the disengagement member in the track assembly of the seat assembly 20 thereby allowing the free motion. This is particularly useful such as in coupes or other seats where the seat back 22 needs to not only be tilted but also the seat base 24 moved along the tracks to allow easier ingress and egress and then returned to its desired seating location quickly.

Figure 11:
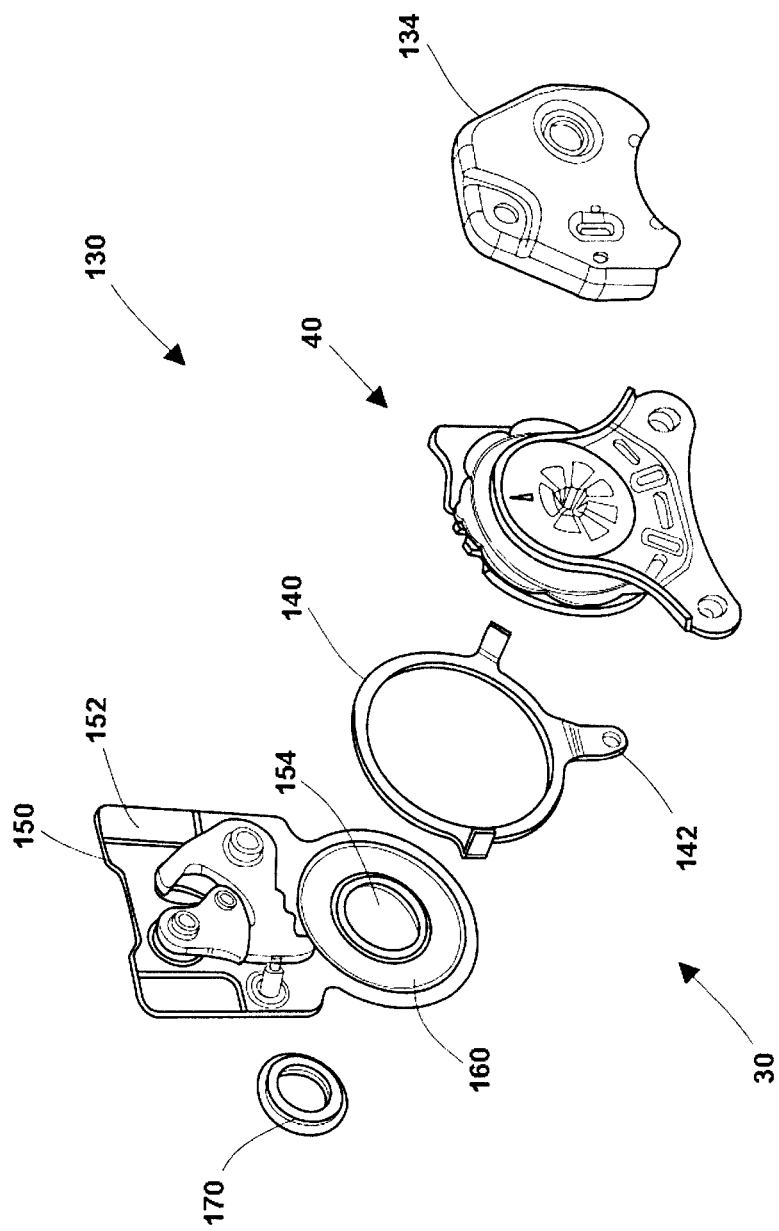
FIG. 11 is an exploded perspective view of the assembly of a three-door rotary recline mechanism including the modified five-door rotary recline mechanism, latch assembly, dump mechanism, and modular mounting plate.

As further illustrated in FIG. 11, in some embodiments a weld end cap 170 may be used to weld the five-door rotary recline mechanism 40 to the modular mounting plate 150 instead to the sidemember 180. Therefore, instead the five-door rotary recline mechanism and three-door embodiment drives the modular mounting plate about the rotational axis and given that the modular mounting plate is also welded to the sidemember 180, it also drives the seat back in the tilt fashion. However, as the five-door rotary recline mechanism 40 is not directly welded to the sidemember, this allows the desired free pivoting of the seat back 22 about the rotational axis 26 when the latch assembly 134 is disengaged from the outer gear 90.

What is claimed is:

1. A seat assembly comprising:
   a seat back capable of being rotated about an axis;
   a sidemember coupled to said seat back, said sidemember including uniform attachment surface having a lower support surface extending circumferentially about said axis and an upper support surface wherein said lower support surface and said upper support surface are at least approximately aligned in the same plane;
   a modular mounting plate having a rear mounting surface substantially aligned with said uniform attachment surface and wherein said modular mounting plate includes an upper weld section and an axial mounting surface and wherein said upper weld section is welded to said upper support surface, and said axial mounting surface engages said lower support surface;
   a five-door recline mechanism coupled to one of said sidemember and said modular mounting plate and;
   a latch assembly coupled to said modular mounting plate and engaging said five-door recline mechanism.

2. The seat assembly of claim 1 wherein said uniform attachment surface is planer.

3. The seat assembly of claim 1 wherein said lower support surface and said upper support surface are in the same plane.

4. A seat assembly comprising:
   a seat back capable of being rotated about an axis;
   a sidemember coupled to said seat back, said sidemember including uniform attachment surface having a lower support surface extending circumferentially about said axis and an upper support surface wherein said lower support surface and said upper support surface are at least approximately aligned in the same plane;
   a modular mounting plate having a rear mounting surface substantially aligned with said uniform attachment surface; and
   wherein said modular mounting plate further includes an upper weld surface engaging said upper support surface and an axial mounting area at least partially engaging said lower support surface;
   a five-door recline mechanism coupled to one of said sidemember and said modular mounting plate; and
   a latch assembly coupled to said modular mounting plate and engaging said five-door recline mechanism.

5. A recline mechanism for a seat assembly comprising:
   a mounting plate;
   a five-door recline mechanism having an axis and assembled thereto and including an outer gear having a set number of teeth and including a gear cavity, and inner gear having at least one less tooth and an axial inner surface and wherein said inner gear is located within said gear cavity, a bearing engaging said axial inner surface, a wedge carrier, wedges located between said wedge carrier and said bearing, a spring and an outer cap driving said wedge carrier;
   an assembly bracket coupled to said mounting plate and enclosing said five-door recline mechanism;
   a side member and wherein said five-door recline mechanism is coupled to said side member at a lower support surface extending circumferentially about said axis and said mounting plate is coupled to said sidemember at least at an upper mounting surface on said side member; and
   a latch assembly engaging said outer gear of said five-door recline mechanism and being coupled to said mounting plate.

6. The recline mechanism of claim 5 wherein said five-door recline mechanism and said mounting plate are welded to said side member.

7. The recline mechanism of claim 5 wherein said mounting plate has an upper weld surface and an axial hole surrounded by an axial mounting surface and wherein said upper weld surface engages said upper support surface and said axial mounting surface engages said lower support surface.

* * * * *

UNITED STATES PATENT AND TRADEMARK OFFICE
CERTIFICATE OF CORRECTION

PATENT NO.        : 9,079,515 B2
APPLICATION NO.   : 13/389472
DATED             : July 14, 2015
INVENTOR(S)       : Bruce A. Hiemstra and Michael J. Kapusky Page 1 of 1

It is certified that error appears in the above-identified patent and that said Letters Patent is hereby corrected as shown below:

Title Page, Item (12) delete "Hiemstra" and insert -- Hiemstra et al. --

Title Page, Item (75) Inventors, should read,

-- (75) Inventors: Bruce A. Hiemstra, Ann Arbor, MI (US) and Michael J. Kapusky, Milan, MI (US) --

Signed and Sealed this
Twenty-first Day of June, 2016

Michelle K. Lee
*Director of the United States Patent and Trademark Office*